United States Patent [19]
Mansell

[11] 3,738,168
[45] June 12, 1973

[54] LASER BEAM SCANNING DEVICE
[75] Inventor: Dennis N. Mansell, Palos Verdes Peninsula, Calif.
[73] Assignee: The United States of America as represented by the Secretary of the Air Force
[22] Filed: Nov. 16, 1971
[21] Appl. No.: 199,184

[52] U.S. Cl. .................. 73/190 R, 250/83.3 HP
[51] Int. Cl. ......................................... G01k 17/00
[58] Field of Search .............. 73/15, 190, 355; 250/83.3 HP

[56] References Cited
UNITED STATES PATENTS
| | | | |
|---|---|---|---|
| 3,604,930 | 9/1971 | Allen | 250/83.3 |
| 2,938,122 | 5/1960 | Cole | 73/355 |
| 3,566,669 | 3/1971 | Lawrence et al. | 73/15 |
| 3,622,245 | 11/1971 | Rasmussen | 73/190 |
| 3,368,076 | 2/1968 | Clifford | 250/83.3 |
| 3,118,061 | 1/1964 | Bender | 250/83.3 |
| 3,391,279 | 7/1968 | Detrio | 250/83.3 |

Primary Examiner—Herbert Goldstein
Attorney—Harry A. Herbert, Jr. and Willard R. Matthews, Jr.

[57] ABSTRACT

Scanning of a high power laser beam while it is being used is accomplished by deflecting the laser beam to its target with a polished metal mirror. Multiple thermocouple wires attached to the rear of the mirror provide temperature (and hence beam power) information at various points on the mirror. Scanning is achieved by means of a selector switch which sequentially samples the thermocouple outputs. The thermocouple output voltages are measured and recorded as a function of laser beam power.

1 Claim, 3 Drawing Figures

INVENTOR
DENNIS N. MANSELL

LASER BEAM SCANNING DEVICE

BACKGROUND OF THE INVENTION

This invention relates to lasers and in particular to apparatus for analyzing and monitoring high power laser beams.

It is often necessary and desirable to evaluate high power laser beams while the laser is in use. In other instances continuous monitoring of operational lasers is required. However, using currently know techniques it is not possible to probe the cross section of a high power laser beam without inserting a screen or probe detector into the higher power region. These devices eventually distort, fracture, or even vaporize as beam power is increased. Also the beam itself is usually distorted by the interfering structures. There currently exists therefore the need for apparatus capable of scanning and analyzing a high power laser beam that can be used while the laser is in operation. It is also important that such apparatus is not destroyed by the laser beam when subjected to extended use and that it does not effect degradation or deterioration of the beam itself. The present invention is directed toward accomplishing these and other ends.

SUMMARY OF THE INVENTION

The apparatus of the present invention comprises a laser beam reflecting mirror to which is attached multiple thermocouple devices. The thermocouple devices are positioned on the mirror in a uniformly spaced array such that the mirror is in effect divided into "zones". The output of any thermocouple device is a measure of the heating of the mirror by the portion of the laser beam being reflected by the "zone" associated with that particular thermocouple device. The output voltage is, of course, also proportional to the power of that particular portion of the laser beam. Scanning of the beam is accomplished by a selector switch which sequentially samples the outputs of each thermocouple device in the array.

In a preferred embodiment of the invention the mirror is a polished copper plate and each thermocouple device is a bimetal element consisting of a constantan wire and the mirror itself.

It is a principal object of the invention to provide new and improved apparatus for scanning a high power laser beam.

It is another object of the invention to provide apparatus for scanning a high power laser beam that can be used while the laser is in use.

It is another object of the invention to provide apparatus capable of monitoring and evaluating the beam power of an operational laser without degrading the beam itself or interfering with its use.

These, together with other objects, features and advantages of the invention will become more apparent from the following detailed description taken in conjunction with the accompanying drawings.

DESCRIPTION OF THE DRAWINGS

FIG. 2 illustrates the laser reflector mirror comprehended by the invention together with a block diagram of associated components.

DETAILED DESCRIPTION OF THE PREFERRED EMBODIMENT

Figure 1:
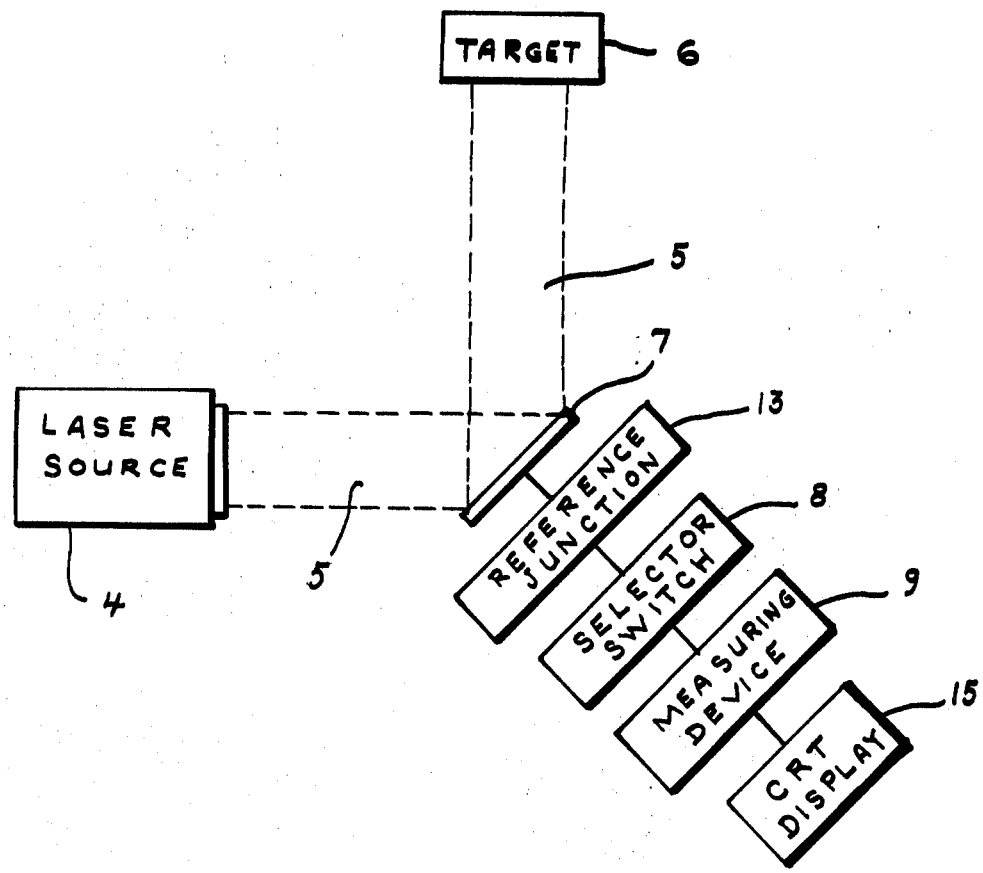

The various components of the apparatus of the invention and their organization and relationship to an operational laser are illustrated in FIG. 1. Laser beam 5 generated by laser source 4 is directed to target 6 by means of reflecting mirror 7. The outputs of a multiplicity of thermocouple devices (not shown) are connected to reference junction 13 wherefrom they are sequentially sampled by selector switch 8. These sampled outputs are measured by measuring device 9 and then recorded or displayed on CRT display 15.

Figure 2:
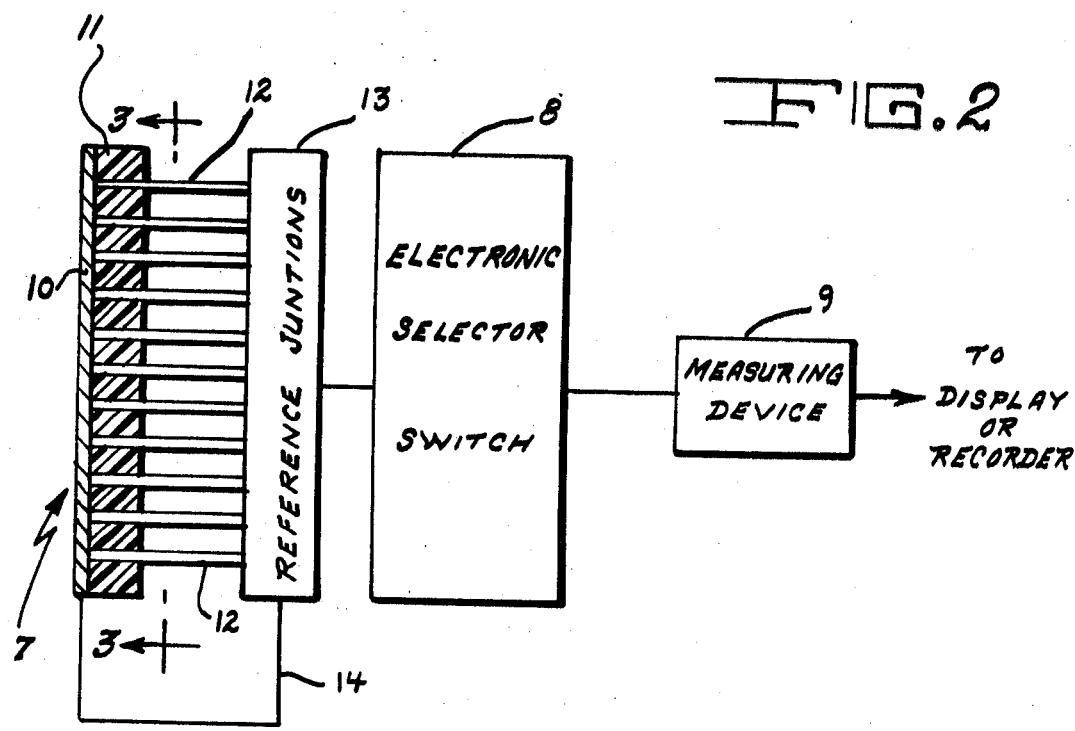
FIG. 2 illustrates in block diagram form the various components of the apparatus of the invention and their relationship to an operational laser.
Figure 3:
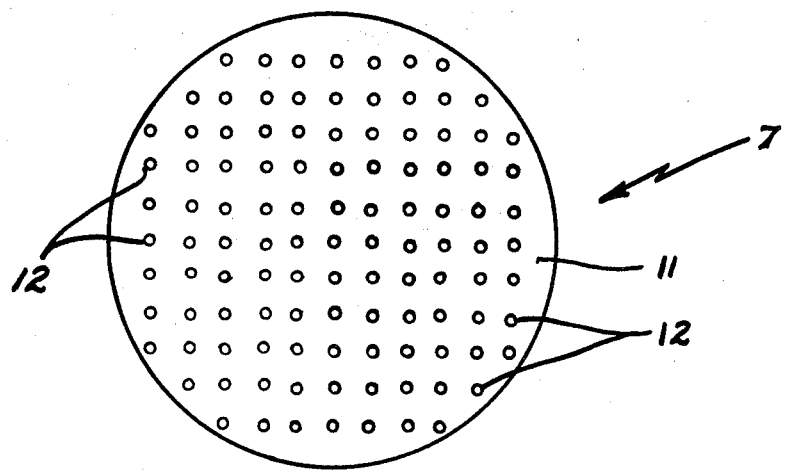
FIG. 3 is a sectional view of the mirror of FIG. 2 taken at 3—3.

Mirror 7 and its associated thermocouple devices are illustrated in more detail in FIGS. 2 and 3. Mirror 7 can advantageously be a thin copper plate having a highly polished surface 10. The thermocouple devices can be constantan wires 12 prependicularly affixed to the rear of mirror 7 by means of epoxy substrate 11. Each thermocouple device in this presently preferred embodiment therefore consists of the two dissimilar metals (the constantan wire and the copper mirror) and the reference junction unit 13. Wire 14 connecting the mirror 7 to reference junction 13 is of course also of copper. Although copper and constantan are indicated here as the thermocouple constituents any other suitable dissimilar metals could be used. Such a choice would depend upon engineering design requirements such as temperature range, beam power, and the like. The constantan wires 12 are arranged in a uniform array as illustrated by FIG. 3. Spacing between wires should be large compared to the thickness of the copper plate to minimize the effect of heating from adjacent zones. The wires can be sequentially scanned in any desired order by means of selector switch 8. Selector switch 8 can be totally electronic thus eliminating the need for moving parts and contactors. The outputs thus sampled are measured by measuring device 9. Any means for measuring small voltages accurately can be used. The millivoltmeter and the potentiometer are typical examples of such a measuring device.

It will be understood that various changes in the detailed materials and arrangement of parts which have been herein described and illustrated in order to explain the nature of the invention may be made by those skilled in the art without departing from the spirit and scope of the invention as defined in the appended claims.

I claim:
1. Apparatus for scanning a high power laser beam comprising
   a mirror adapted to deflect a high power laser beam, said mirror comprising a single thin copper plate having one highly polished reflecting surface,
   a multiplicity of thermocouple devices operably engaged to the rear of said mirror and arranged in a uniform array, the spacing between array devices being larger relative to the mirror plate thickness and adapted to provide a substantially isolated temperature zone for each said thermocouple device,
   a selector switch adapted to sequentially sample the output voltage of said thermocouple devices,
   means for measuring the sampled thermocouple output voltages, and
   means for recording the measured output voltages as a function of laser beam power.

* * * * *